(12) United States Patent
Stone et al.

(10) Patent No.: US 8,453,585 B2
(45) Date of Patent: Jun. 4, 2013

(54) OXY-COMBUSTION COAL FIRED BOILER AND METHOD OF TRANSITIONING BETWEEN AIR AND OXYGEN FIRING

(75) Inventors: Bryan B. Stone, Cambridge (CA); Denny K. McDonald, Massillon, OH (US); Allan J. Zadiraka, Akron, OH (US); Rajani K. Varagani, Sugarland, TX (US)

(73) Assignees: Babcock & Wilcox Power Generation Group, Inc., Barberton, OH (US); American Air Liquide, Inc., Fremont, CA (US)

( * ) Notice: Subject to any disclaimer, the term of this patent is extended or adjusted under 35 U.S.C. 154(b) by 958 days.

(21) Appl. No.: 12/422,685

(22) Filed: Apr. 13, 2009

(65) Prior Publication Data

US 2009/0255450 A1  Oct. 15, 2009

Related U.S. Application Data

(60) Provisional application No. 61/044,528, filed on Apr. 14, 2008.

(51) Int. Cl.
*F23J 11/00* (2006.01)

(52) U.S. Cl.
USPC ........... 110/345; 110/341; 110/342; 110/347; 110/348; 110/185; 110/186; 110/187; 110/188; 431/2; 431/6; 431/10; 431/11; 431/76

(58) Field of Classification Search
USPC ................ 110/345, 341, 342, 185, 186, 188, 110/187, 204, 347, 348, 182.5, 233, 234; 431/2, 431/5, 6, 8, 10, 11, 76; 122/6.6, 1 A, 479.2; 266/186, 187
See application file for complete search history.

(56) References Cited

U.S. PATENT DOCUMENTS

| | | | | |
|---|---|---|---|---|
| 3,690,632 | A * | 9/1972 | Munson | 266/84 |
| 4,592,293 | A * | 6/1986 | Toyama et al. | 110/347 |
| 5,040,470 | A * | 8/1991 | Lofton et al. | 110/234 |
| 7,320,288 | B2 * | 1/2008 | Marin et al. | 110/345 |
| 2004/0261671 | A1* | 12/2004 | Taylor | 110/261 |
| 2008/0160464 | A1* | 7/2008 | Ghani et al. | 431/9 |
| 2008/0286707 | A1* | 11/2008 | Panesar et al. | 431/10 |
| 2009/0013941 | A1* | 1/2009 | Alexander et al. | 122/1 A |

* cited by examiner

*Primary Examiner* — Kenneth Rinehart
*Assistant Examiner* — Bao D Nguyen
(74) *Attorney, Agent, or Firm* — Michael J. Seymour; Eric Marich; Christopher J. Cronin

(57) ABSTRACT

A new and unique boiler and method of transition between air and Oxy-combustion in a coal fired combustion process wherein near pure oxygen may be introduced to the boiler furnace in several locations including directly into the flame through the burner and/or directly into the furnace as nearly pure oxygen, and/or into the recycle flue gas streams to the burners, including both primary and secondary streams.

20 Claims, 2 Drawing Sheets

OXY-COMBUSTION COAL FIRED BOILER AND METHOD OF TRANSITIONING BETWEEN AIR AND OXYGEN FIRING

This application claims priority to U.S. Patent Application No. 61/044,528 filed on Apr. 14, 2008 entitled "Method of Transitioning from Air to Oxy and Oxy to Air Fired Combustion in a Utility Oxy Combustion Power Plant"

FIELD OF THE INVENTION

1. Field of the Invention

The present invention relates generally to oxy-combustion, and in particular, to a new and useful combustion apparatus and methodology of fossil fuel combustion wherein combustion air is replaced with an oxygenated combustion gas to produce a flue gas comprised primarily of carbon dioxide.

2. Background

The combustion of fossil fuels such as coal has provided a reliable and cost effective means of producing electricity for several decades. During this time ever-tightening emissions constraints across different regions of the world have continually produced a need to develop new and improved technologies aimed at reducing coal fired plant emissions to near zero.

Over the years this need has been met as technologies to control the emission of many pollutants such as sulfur oxides, nitrogen oxides, particulates, and mercury were successfully developed. Recently however, a growing concern has developed to control or otherwise regulate the emission of carbon dioxide from coal fired power plants.

One promising technology capable of reducing carbon dioxide emissions is oxy-combustion. In traditional coal fired applications, coal is combusted in the presence of air, which is approximately 79 percent by volume nitrogen. Carbon dioxide, a natural byproduct of combustion, is present as a dilute constituent of the resulting flue gas, thus requiring an additional step such as chemical scrubbing to separate the carbon dioxide from the flue gas.

Unlike traditional air firing, oxy-combustion enables the combustion of coal in the absence air, thereby eliminating Nitrogen's dilution effect. Air is replaced with recycled flue gas and near pure oxygen is introduced into the combustion system in sufficient quantities to produce a flue gas consisting essentially of carbon dioxide and water. In addition to reducing nitrogen oxide emissions by virtue of an absence of nitrogen, the resulting carbon dioxide rich combustion byproduct can be processed without the need of an additional chemical scrubbing step.

While the abstract concept and associated benefits of oxy-combustion presented above can be appreciated, significant technical challenges remain for oxy-combustion to be implemented on a commercial scale. These challenges include but are not limited to developing a means of adequately oxygenating a flue gas and a methodology of starting up, transitioning to, and operating a commercial scale oxy-combustion boiler.

SUMMARY OF THE INVENTION

The present invention solves the aforementioned problems by providing an oxy-combustion boiler structure and a method of operating, transitioning to, and starting up an oxy-combustion boiler. The present invention further promotes control of carbon dioxide emissions by providing a combustion methodology capable of producing a flue gas consisting essentially of carbon dioxide and water, which is readily capable of being processed for storage or other industrial uses.

The present invention provides a boiler structure and methodology for transition between air and oxygen firing for a utility coal boiler. Transition may begin with either the primary or secondary stream, or both concurrently. Once the transition is initiated by the operator, the flue gas recycle flow control damper for the stream being transitioned is gradually ramped open allowing flue gas to enter the fan (FD for secondary stream or and PA for primary stream) inlet and mix with the air entering from the fresh air intake.

With the recycle flow control damper open, the fresh air inlet control damper for the fan being transitioned is gradually ramped closed, further increasing the recycle flue gas flow into the fan inlet. During this process, a near pure oxygen gas flows from an oxygen supply to one or more oxygen/recycled flue gas mixing locations.

The gas flow and mixing rates are carefully measured and controlled based on the changing contributions from the fresh air and flue gas recycle streams to provide the proper proportions of gaseous mass flow and oxygen needed for complete combustion of the fuel, and trimmed as necessary to maintain desired excess oxygen levels at the boiler outlet to account for unmeasured variation in the composition of the fuel being combusted. During transition between the air and oxygen firing modes, the transition density is calculated as a function of the measured recycled flue gas and fresh air flows and the measured oxygen level in the recycled flue gas.

Once the fresh air inlet control dampers are closed, the associated fresh air isolation dampers are closed to minimize the infiltration of nitrogen rich air into the flue gas recycle through the fresh air inlet control damper. FD and PA fans control and maintain the required mass flows in the primary and secondary streams during transition.

FD and PA fan flows are measured after the airheater to account for any leakage in the airheater. These flows are temperature compensated based on the densities of the air and oxygen/recycle gas flow streams. Equilibrium is maintained by venting excess flue gas flow (the sum of the excess oxidant added, air infiltration, and the products of combustion) to the stack. System pressure during transition is maintained by regulating the stack inlet damper.

Full oxygen combustion mode is established once both the primary and secondary streams are full transitioned and all fresh air intakes are fully closed. Once the flue gas reaches the desired CO2 concentration in full oxygen combustion mode, the Compression and Purification Unit (CPU) can be placed in service.

As the compressor is loaded, the stack inlet damper will begin to close in a controlled manner that maintains the desired pressure balance. When the stack inlet damper reaches the limit of its control range, control of the system pressure balance will switch to the CPU, wherein the non-recycled flue gas (having a high CO2 concentration) that would otherwise exit the stack is processed by the CPU for CO2 purification and pressurization into a liquid form for storage via sequestration or otherwise.

The various features of novelty which characterize the present invention are pointed out with particularity in the claims annexed to and forming a part of this disclosure. For a better understanding of the invention, its operating advantages and specific benefits attained by its uses, reference is made to the accompanying drawings and descriptive matter in which the preferred embodiments of the invention are illustrated.

DEFINITIONS

Figure 1:
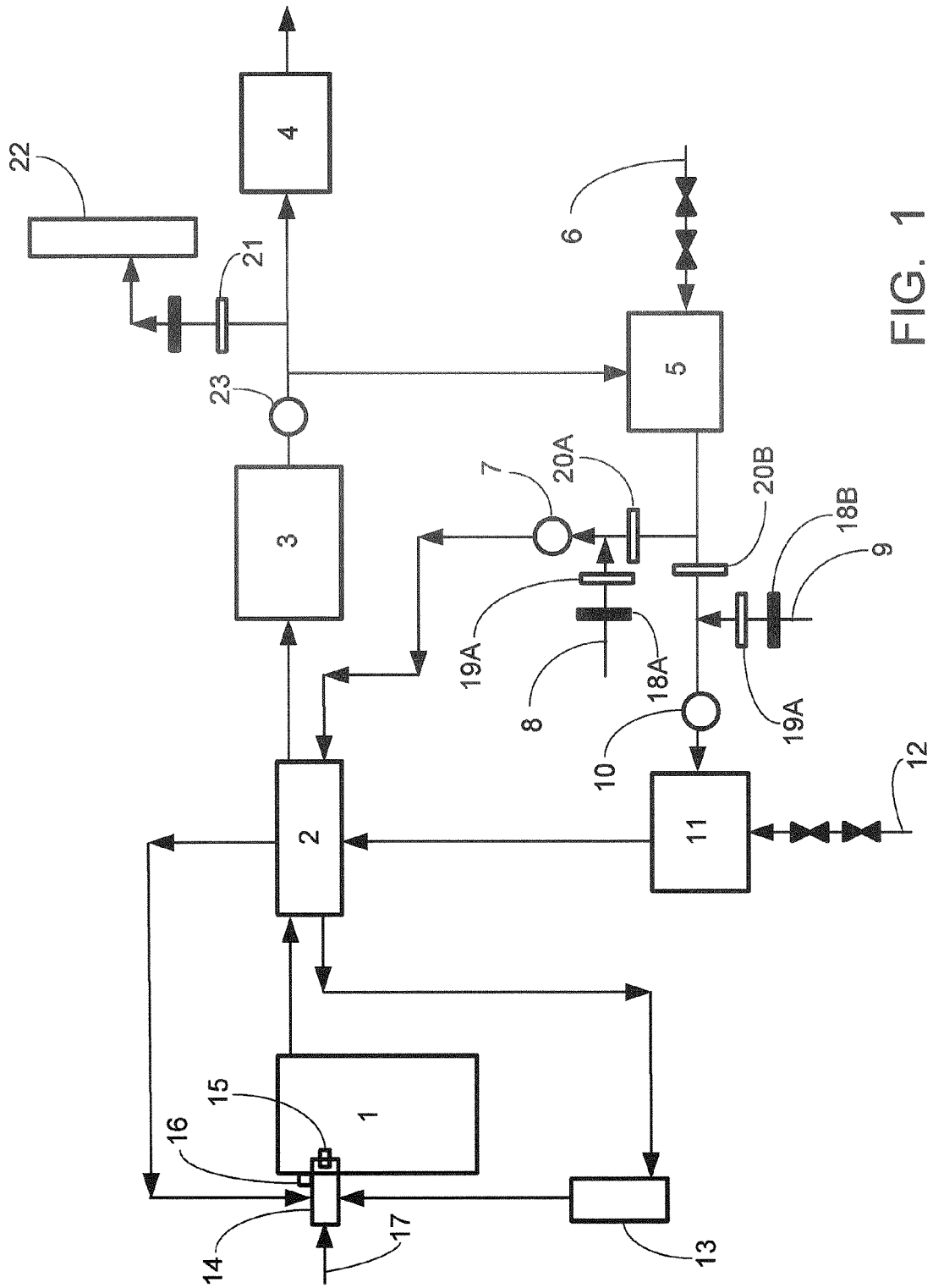
FIG. 1. is a schematic section view of a oxy-combustion boiler arrangement of the present invention.
Figure 2:
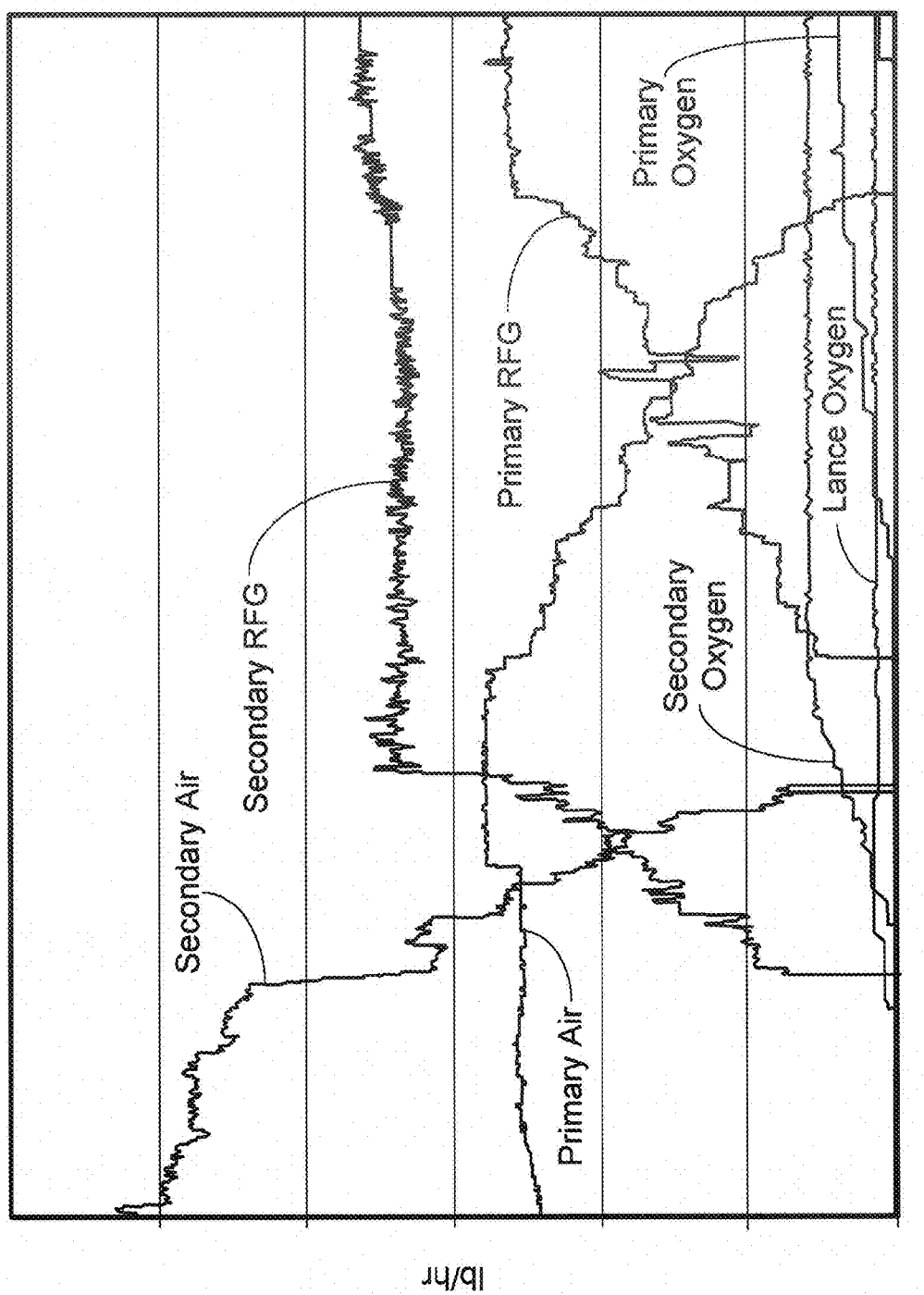
FIG. 2. is a graphical representation of mass flow rate over time for of the various stream involved in a air to oxy firing transition.

The following term shall be defined as provided hereunder:

Stoichiometric Oxygen is defined as the amount of theoretical oxygen required to combust a given fuel at a given load.

Excess oxygen is defined as the oxygen measured at the boiler economizer outlet.

Target Excess Oxygen is defined as the oxygen desired above the stoichiometric requirement at a given load.

Total Oxygen Demand is defined as the oxygen mass flow required to provide both the stoichiometric oxygen required at a given load and the target excess oxygen.

Oxygen Supply Demand is defined as the oxygen required to supply the difference between the Total Oxygen Demand and the oxygen provided by the recycle gas stream and any air infiltration into the system. This nearly pure oxygen is typically supplied by an air separation unit (ASU) and the Oxygen Supply Demand is also referred to as the ASU Demand.

Oxygen is defined as nearly pure oxygen, which may be supplied by an air separation unit (ASU)

DETAILED DESCRIPTION

Oxygen combustion is a means of drastically decreasing the amount of nitrogen in the flue gas from a boiler firing a carbonaceous fuel in order to achieve a much higher concentration of carbon dioxide ($CO_2$) in the combustion gasses to permit cleaning, compression and storage.

The present invention provides a new and unique coal fired oxy-combustion process wherein near pure oxygen may be introduced to the boiler furnace in several locations including directly into the flame through the burner and/or directly into the furnace as nearly pure oxygen, and/or into the recycle flue gas streams to the burners, including both primary and secondary streams.

The boiler unit is preferably started up on air, and subsequently transitioned to oxy-combustion firing wherein as much as about 70 percent, and in some applications greater than 70 percent, of flue gas leaving the boiler is recycled back to the combustion process replacing the air normally used for combustion. A brief description of a means of air start up to achieve a gas mass flow is provided below. The description is merely exemplary in nature to provide a broader understanding of fossil fuel combustion. The steps provide shall not be interpreted as necessary elements of the present invention, as there are various methodologies of starting an air fired boiler, many of which are dependent on boiler arrangement, fuel, and other criteria.

Coal Fired Utility Start-Up on Air

A first step in starting an air fired boiler system is establishing an open flow path through the unit by opening control and shutoff dampers between the forced draft fan inlet and the unit's stack. As part of establishing the open flow path, the burner air registers are positioned to their burner light-off position, which typically establishes a small flow of air through the unit by natural draft created by the stack effect.

Once and open flow path is established, the control and outlet damper on the first induced draft (ID) fan are closed as part of the ID fan start procedure. The dampers remain open on the second ID fan maintaining the open flow path. The ID fan motor is energized and after the fan comes up to speed; its outlet damper is opened as the outlet damper on the other ID fan is closed to eliminate any recirculating flow through the idle ID fan. The operating ID fan inlet vane position or blade angle, depending on whether it is a centrifugal or axial flow fan, is adjusted to provide an air flow through the unit while maintaining the furnace at a desired pressure.

In a similar fashion, the control and outlet damper on the first forced draft (FD) fan are closed as part of its start procedure. The dampers remain open on the second FD fan maintaining the open flow path. The FD fan motor is energized and after the fan comes up to speed; its outlet damper is opened as the outlet damper on the other FD fans are closed to eliminate any recirculating flow through the idle FD fan. The operating FD fan inlet vane position or blade angle, depending on whether it is a centrifugal or axial flow fan, is adjusted to establish the minimum boiler air flow through the unit required to perform a purge of the boiler enclosure. The ID fan 23 is adjusted at the same time to maintain the furnace at a desired pressure.

The unit is then purged with all sources of fuel or other combustibles proven off to remove any combustibles which may be present in the unit. Code requires the purge rate air flow be maintained through the unit for at least five minutes and until at least five volume changes of the boiler enclosure have occurred. The air flow is required to be at least 25% of the design full load mass air flow for the unit and, for coal fired units, not greater than 40% of the design full load mass air flow. The boiler enclosure is defined by code as the volume where combustion occurs and is enclosed by pressure parts. Depending on the specific coal characteristics a unit is designed to fire, the time required to achieve five volume changes can be longer than the minimum five minutes specified to account for the enclosure volume.

When the purge requirements have been satisfied, the Master Fuel Trip (MFT) relays are reset, allowing firing to be initiated in the unit. Igniters, generally natural gas or oil are placed in service to begin warming the unit. As the unit warms up, the secondary air temperature will increase, improving the combustion in the unit. Once heat input from the igniters is insufficient to further increase steam flow from the unit, coal firing is initiated.

With the igniters in service on the first coal pulverizer to be placed in service, a Primary Air (PA) fan will be started with its control and outlet dampers closed. After the PA fan motor comes up to speed, its outlet damper will be opened. Its inlet damper will try to maintain the desired pressure in the duct downstream even though no hot or tempering air flow occurs since primary air flow has yet to be established through any pulverizer.

The PA shutoff damper on the first pulverizer to be placed in service will be opened and then the burner line shutoff valves on the pulverizer will be opened establishing primary air flow through the pulverizer to the burners. To prevent exposing pulverizer lubricants and seals to the hot primary air flow (~500-700 F) temperatures prior to coal being admitted to the pulverizer, the primary air flow is limited to only tempering air flow (~110 F) as the hot air damper is maintained closed.

Depending on the grade of coal and the weather conditions it has been exposed to since it was mined, the inherent and surface moisture of the raw coal can vary from greatly. Once the primary air flow has stabilized, the feeder discharge gate is opened and the raw coal feeder is started. With the coal flow available to limit excessive temperatures in the pulverizer, the temperature of the coal-air mixture at the pulverizer outlet is controlled with the hot air damper opening while the tempering air damper closes to achieve the desired pulverizer outlet temperature for stable combustion and to achieve drying of the coal to improve the grinding process. The ratio of hot and tempering air flows is controlled to maintain the outlet temperature at its setpoint. This changes the temperature of the primary air entering the pulverizer to provide the heat needed to evaporate surface moisture and raise the temperature of the coal and remaining moisture to the outlet temperature.

The raw coal entering the pulverizer goes through the grinding zone and is fluidized by the primary air flow with only the desired smaller particles (70% through 200 mesh) making it through the classification action in the pulverizer. The coal which is rejected recycles back through the grinding zone along with the raw coal feed. This coal storage in the pulverizer results in the coal to the burners lagging the raw coal feed by a $3^{rd}$ or $4^{th}$ order lag function. Once sufficient coal flow to the burners is achieved for stable combustion, the burner air registers on the operating pulverizer are opened to their firing position.

As the loading on the boiler is increased, the raw coal feed rate and primary air flow are increased. Total boiler air flow is maintained at the purge rate air flow with the secondary air flow decreasing proportionally to the increase in primary air flow. As load conditions permit, an additional pulverizer is placed in service following the same procedure.

When the boiler firing rate air flow requirements exceed the purge rate air flow, the total boiler air flow is increased to maintain the desired excess air for the firing rate. At this point, air registers on idle burners are moved to their cooling positions to distribute the required air to the operating burners.

With stable combustion established in the furnace, igniters can be removed from service. This condition normally requires at least two pulverizers in service, the unit load above 25 percent and the combustion air temperature above 200 F.

Additional pulverizers are placed in service as required by the unit load by placing its air registers to the light off position, placing its igniters in service and starting the pulverizer following the procedure described above.

Transition from Air to Oxy-Combustion

Once a minimum load for transition is reached, a coal fired boiler can be transitioned from using air as the oxidant to using near pure oxygen. Minimum load for transition will vary based upon boiler type, in drum boiler applications for example minimum load would be approximately 30% load, and in general below about 40% load in most applications. Essential to the transition is controlling flue gas recycle. During transition, the mass volume of nitrogen from air is essentially eliminated and the resulting quantity of combustion gas produced can be approximately a fourth of that in air firing. In order to provide the gas mass flow necessary for maintaining the required boiler heat absorption during transition, flue gas is recycled. The present invention, as described herein, provides a means of smoothly and safely transitioning from air firing to oxy-combustion with flue gas recycle.

A coal fired boiler 1, such as that schematically illustrated in FIG. 1, is provided and started in a usual air fired manner and brought to an approximately stable load. An oxygen supply system, such as an Air Separation Unit (ASU), is proximately available and prepared for oxygen supply service prior to initiating transition.

To facilitate the transition and minimize air infiltration, individual flow control dampers 19A, 19B and tight shutoff (TSO) dampers 18A, 18B are provided on the fresh air intakes 8, 9 upstream of the Forced Draft 10 and Primary Air fans 7. Air flow measurement is also provided. Recycle flow control dampers 20A, 20B are also provided at the take-off of the primary and the secondary recycle flues to their respective fans.

Prior to the initiation of the transition, the FD 10 and PA 7 fans, fresh air inlet control 19A, 19B and isolation (tight shut-off) dampers 18A, 18B will be fully open and the associated flue gas recycle control dampers 20A, 20B fully closed. The stack inlet damper 21 will be open with all flue gas going to the stack.

In a first transition step, oxygen may be supplied to the system through an operating burner 14 via an oxygen lance 15. In this embodiment the lance 15 is preferably purged prior to the addition of oxygen to avoid accumulation of particulate and cool the lance. In this step oxygen is first introduced to the lance of the operating burners at a minimum flow rate as defined by lance cooling requirements then increased as needed during transition to maintain stability of combustion at the burner.

In another transition step, the secondary recycle damper 20B begins to open and the transition between secondary air and secondary oxygenated recycled flue gas begins. As the FD fan fresh air feed damper 19B begins to close, secondary oxygen, provided to the secondary oxygen mixer 11 is mixed with recycled flue gas and any remaining intake air to produce a secondary oxygenated recycled flue gas of a desired oxygen concentration. Transition is complete once the secondary recycle damper 20B is fully opened and the FD fan fresh air damper is closed 19B. In one embodiment the transition occurs at a rate between about 1 and about 3 percent full load per minute, and more preferably at about 2 percent full load per minute. It is understood that rate of transition will vary from this embodiment due to variation in boiler applications, fuel types and other design criteria.

During this step of oxygenating the secondary recycled flue gas the oxygen concentration is monitored downstream of the secondary oxygen mixer 11. Introduction of oxygen into the secondary mixer 11 is then adjusted to maintain between about 4 percent and about 28 percent oxygen in the secondary oxygenated recycled flue gas. In a preferred embodiment the oxygen concentration is maintained between about 18 and about 23 percent. Once transition is complete, tight shut off damper 18B is closed to prevent air infiltration.

In another transition step, primary recycle damper 20A subsequently begins to open and the transition between primary air and primary oxygenated recycled flue gas begins. As the PA fan fresh air feed damper 19A begins to close, primary oxygen, provided to the primary oxygen mixer 5 is mixed with recycled flue gas and any remaining intake air to produce a primary oxygenated recycled flue gas of a desired oxygen concentration. Transition is complete once the primary recycle damper 20A is fully opened and the PA fan fresh air damper 19A is closed. In a preferred embodiment the transition occurs at a rate between about 2 and about 4 percent full load per minute, and more preferably at about 3 percent full load per minute.

During this step of oxygenating the primary recycled flue gas the oxygen concentration is monitored downstream of the primary oxygen mixer 5. Introduction of oxygen into the primary oxygen mixer 5 is then adjusted to maintain between about 16 and about 23.5 percent oxygen. In a preferred embodiment the oxygen concentration is maintained between about 17 and about 20 percent. In embodiments where primary and secondary oxygen mixer 5, 11 operate in series, introduction of oxygen into the secondary oxygen mixer 11 is concurrently adjusted to maintain the desired levels of oxygen in the secondary oxygenated recycled flue gas. Once transition is complete, tight shut of damper 18A is closed to prevent air infiltration.

Once transition has occurred, boiler load may be adjusted to full or an otherwise desired less than full load. As load is adjusted, coal flow and oxygen flow are preferably adjusted separately, such that adjustments in oxygen flow lead adjustments in fuel flow on load increases and lag the fuel flow on load decreases.

While the boiler firing rate controls the total oxygen and flue gas recycle flow demands, in an alternative embodiment, the oxygen/recycle gas flow ratio may be used to trim (increase or decrease) furnace absorption for steam temperature control.

In the above embodiment transition to the secondary oxygenated recycled flue gas is completed first, subsequently followed by the transition to the primary oxygenated recycled flue gas. Depending on what is most expedient in a specific plant configuration, in an alternative embodiment the order in which the transitions occur could be reversed or the transitions may occur in parallel, either simultaneously or one lagging the other.

In another alternative embodiment, igniters may be used to support combustion until the transition is complete.

A boiler arrangement of the present invention is shown schematically in FIG. 1. During oxy-combustion transition and operation, oxygen is provided to the primary oxygen mixer 5 though oxygen inlet 6, and to the secondary oxygen inlet through secondary oxygen inlet 12. Additional oxygen 17 may also be provided directly to the burner 14 via an oxygen lance 15.

Prior to reaching the burner, both the primary oxygenated recycled flue gas stream and the secondary oxygenated recycled flue gas stream are optionally preheated via air heater 2. The primary oxygenated recycled flue gas stream then proceed to the pulverizer 13, and the secondary oxygenated recycled flue gas stream proceed to the windbox 16.

Oxy-combustion occurs in the boiler 1, wherein optional levels fuel and oxidant provided to the burner are combusted to produce a CO2 rich flue gas. The resulting flue gas exits the boiler, enters the air heater 2, and is subsequently undergoes post combustion pollutant cleansing measures 3 (i.e. SO2, particulate, and moisture removal).

Once cleansed the stream of oxy-combustion flue gas is split into a flue gas recycle stream and a CO2 purification and compression stream. The flue gas recycle stream proceeds to the primary oxygen mixer 5 to be enhanced with oxygen from primary oxygen inlet 6. The CO2 compression stream proceeds to a CPU 4 for processing. Prior to transition the non-recycled flow gas flow will exit at the stack 22. Stack damper 21 regulates flue gas flow to the stack 22. During transition stack damper 21 begin to shut, reduced flow to the stack 22, and increasing flow to the CPU 4 When damper 21 is full closed transition from venting flue gas to capturing CO2 capture is complete.

In an alternative embodiment, the methodology of the present invention may also be applied to transitioning from oxy-combustion firing to air firing. The transition back to air firing is essentially the reverse of transitioning from air to oxy-combustion.

In a first step, the boiler load is reduced to transition load and the CPU 4 is removed from service and flow through the stack is re-established. The primary recycled flue gas stream is then transitioned to air by first opening tight shut off damper 18A then slowly opening control damper 19A while concurrently closing recycle damper 20A. The secondary recycled flue gas stream is then transitioned to air by first opening tight shut off damper 18B then slowly opening control damper 19B while concurrently closing 20B. During this process the oxygen added is regulated as necessary to maintain a desired concentration in the oxygenated recycle gas. Once transition is complete all oxidant necessary for combustion is supplied from the fresh air intakes 8, 9 and the oxygen supply mean can be taken off line.

While the specific embodiments of the invention have been shown and described in detail to illustrate the application of the principles of the invention, it will be understood that the invention may be embodied otherwise as appreciated by one of ordinary skill in the art without departing from the scope of the present invention.

We claim:

1. A method of transitioning to oxy-combustion comprising:
   providing a boiler;
   combusting a fossil fuel in the presence of air to create a flue gas wherein a burner is provided with a primary air stream and a secondary air stream;
   measuring a flue gas oxygen concentration at the boiler exit;
   increasing the flue gas oxygen concentration at the boiler exit by introducing an oxygen stream to the burner;
   opening a flue gas recycle damper;
   providing an additional oxygen stream to an oxygen mixer;
   creating a secondary oxygenated recycled flue gas by mixing the flue gas with the additional oxygen stream;
   transitioning from the secondary air to the secondary oxygenated recycled flue gas by incrementally closing a secondary fresh air intake damper;
   creating a primary oxygenated recycled flue gas by mixing the flue gas with the additional oxygen stream; and
   transitioning from the primary air stream to the primary oxygenated recycled flue gas by incrementally closing a primary fresh air intake damper;
   wherein the primary oxygenated recycled flue gas and the secondary oxygenated recycled flue gas are preheated via an air heater; and
   wherein the primary oxygenated recycled flue gas and the secondary oxygenated recycled flue gas are created upstream of the air heater.

2. The method of claim 1 including the step of measuring an oxygen concentration of the primary oxygenated recycled flue gas downstream of a primary oxygen mixer.

3. The method of claim 2 including the step of measuring an oxygen concentration of secondary oxygenated recycled flue gas downstream of a secondary oxygen mixer.

4. The method of claim 3 wherein the oxygen concentration of secondary oxygenated recycled flue gas downstream of the secondary oxygen mixer is maintained between about 18 and about 28 percent during transition.

5. The method of claim 4 wherein the oxygen concentration of the primary oxygenated recycled flue gas downstream of the primary oxygen mixer is maintained between about 16 and about 23.5 percent during transition.

6. The method of claim 5 wherein the oxygen concentration of the flue gas at the boiler exit is maintained between about 2 and about 7 percent during transition.

7. The method of claim 6 wherein the transition to the secondary oxygenated recycled flue gas occurs before the transition to the primary oxygenated recycled flue gas.

8. The method of claim 6 wherein the transition to the primary oxygenated recycled flue gas occurs before the transition to the secondary oxygenated recycled flue gas.

9. The method of claim 6 wherein the transition to the primary oxygenated recycled flue gas occurs concurrently with the transition to the secondary oxygenated recycled flue gas.

10. The method of claim 6 wherein a primary oxygen mixer oxygenates both the primary oxygenated recycled flue gas and the secondary oxygenated recycled flue gas.

11. The method of claim 10 wherein a secondary oxygen mixer further oxygenates the secondary oxygenated recycled flue gas to a level higher that the primary oxygenated recycled flue gas.

12. The method of claim 11 wherein the oxygen concentration of the primary oxygenated recycled flue gas measured downstream of the primary oxygen mixer is maintained between about 16 and about 20 percent during transition.

13. The method of claim 12 wherein the oxygen concentration of the secondary oxygenated recycled flue gas measured downstream of the secondary oxygen mixer is maintained between about 18 and about 23 percent during transition.

14. The method of claim 13 including the step of closing a primary fresh air intake tight shut off damper once the primary fresh air intake damper is closed to minimize air infiltration.

15. The method of claim 14 including the step of closing a secondary fresh air intake tight shut off damper once the secondary fresh air intake damper is closed to minimize air infiltration.

16. The method of claim 14 wherein boiler load is maintained relatively constant during transition.

17. The method of claim 6 wherein the primary oxygenated recycled flue gas is heated in the air heater prior to reaching a pulverizer.

18. The method of claim 17 wherein the secondary oxygenated recycled flue gas is heated in the air heater prior to reaching a windbox.

19. A method of transitioning from oxy-combustion to air combustion comprising:
providing a boiler combusting a fossil fuel in the presence of oxygen to create a flue gas wherein a burner is provided with a primary oxygenated recycled flue gas stream and a secondary oxygenated recycled flue gas stream, wherein the primary oxygenated recycled flue gas stream and the secondary oxygenated recycled flue gas stream are preheated via an air heater;
reducing a flow of primary oxygen stream to a primary oxygen mixer;
transitioning from the primary oxygenated recycle stream to the primary air stream by opening a primary fresh air tight shut off valve and a primary fresh air intake damper;
reducing a flow of secondary oxygen to a secondary oxygen mixer;
transition from the secondary oxygenated recycle steam to the primary air stream by opening a secondary fresh air tight shut off valve and a secondary fresh air intake damper; and
closing a recycle damper;
wherein the primary oxygenated recycled flue gas and the secondary oxygenated recycled flue gas are created upstream of the air heater.

20. The method of claim 19, wherein a flow of oxygen provided to the burner during oxy-combustion is shut-off after closing the recycle damper.

* * * * *